Patented Feb. 21, 1933

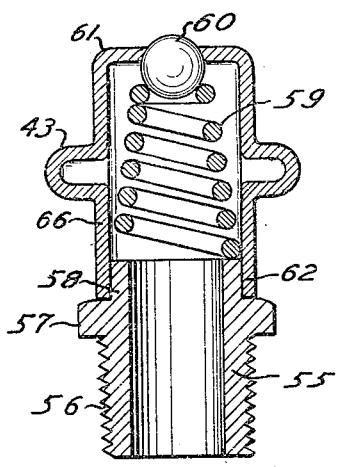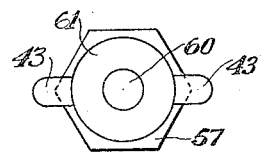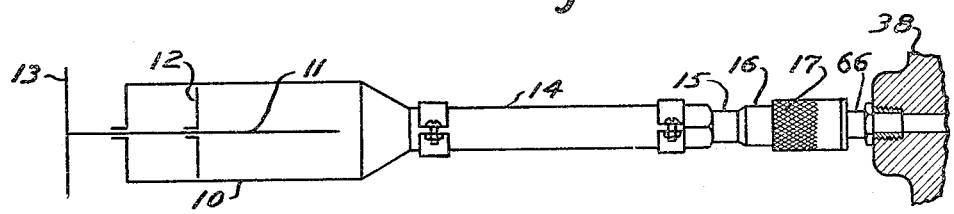

1,898,184

UNITED STATES PATENT OFFICE

JOSEPH HASS, OF NEW YORK, N. Y.

LUBRICATING SYSTEM

Application filed May 19, 1930. Serial No. 453,613.

The subject matter of the present invention deals with a valve fitting of the type employed with bearings of lubricating systems to which lubricant is supplied under pressure.

In actual practice it is well known that irrespective of the design of the valve fitting and a cooperating adapter associated with an interconnecting flexible tube to which lubricant is fed from a source of lubricant supply it is difficult to obtain a fluid light seal between the adapter and fitting and that leakage of lubricant takes place about the seat of the valve of the fitting and in some instances overflows the adapter receiving portion thereof and into the interconnecting tube due to back pressure within an associated bearing. In addition to the back pressure developed the opposing axial pressure caused by the source of lubricant supply also acts on the interconnecting flexible feed tube. The interconnection of the back pressure and the opposing axial pressure sets up excessive radial and longitudinal pressure in the interconnected tube causing distortion and in some instances disabling the latter.

Accordingly the object of the invention provides means for eliminating the above noted disadvantages whereby the fitting operates to give, that is, disconnect in the event the pressure developed in the bearing becomes appreciably great.

Still another object of the invention is to provide a fitting comprising a bushing frictionally supporting an adapter receiving portion having diametrically opposed integral arms or lug members cooperating with an inner connecting member of the adapter to support the latter.

The invention is exemplified in the combination and arrangement of parts shown in the accompanying drawing and described in the following specification and it is more particularly pointed out in the appended claims.

In the drawing which shows a preferred form of one embodiment of my invention.

Fig. 1 is a schematic view of a lubricant dispensing device applied to a fitting in accordance with the invention.

Fig. 2 is an elevational view of the fitting shown in section.

Figure 3 is a plan view looking down on Figure 2.

Referring to the embodiment of my invention described in the illustrations, the lubricant dispensing device, shown in Figure 1, is generally denoted 10 comprising a cylinder operatively and adjustably carrying piston rod 11 on which is threadedly mounted piston 12 adjusted by the controllable manipulator 13 adapted to move the piston longitudinally of the casing and piston rod to expel lubricant under pressure into the intermediate communicating tube or interconnecting flexible pipe 14 suitably detachably associated with a threaded contracted portion 15 of an inner communicating member 16 comprising a part of the adapter broadly designated 17.

The fitting according to the invention comprises an axially bored bushing 55 having a threaded portion 56, preferably connected to bearings as 38 to be supplied with lubricant and includes an annular flange 57 integrally merging with a nipple receiving portion 58 concomitantly constituting a seat for the spiral spring 59 yieldably holding ball check valve 60 against seat 61, the latter constituting a top wall spun inwardly and forming an integral part of the nipple generally indicated 66 which preferably is a one piece integral member and includes integral lugs as 43, the latter merging with a lower portion 62 frictionally held solely against the uninterrupted nipple receiving uninterrupted portion 58 and maintained against the abutting flange 57. Thus it follows, that the fitting comprises essentially two parts, namely the bushing and its associated nipple which detach as heretofore disclosed, in the event that the pressure stored up within the bearing and fitting becomes sufficiently great.

Where the back pressure becomes sufficiently great in the bearing and fitting, excessive pressure is stored up in the interconnecting tube 14 and even against the piston 12 causing either the former to distort or the latter to jam against the piston rod 11. This condition is overcome, by providing a fitting which will give and separate and in Fig. 2, it will be noted, that the fitting, if sufficient pressure is stored up in the bearing will cause the nipple to separate from the bushing. With the nipple separated from the bushing, the latter may be removed from the bearing and conveniently replaced by a new fitting according to the invention.

In the broader aspect of the invention I do not desire to be understood as limiting its embodiment to details herein shown illustratively as a wide variety of modifications may be made within the scope of the appended claims without departing from the spirit of the invention.

What I claim is:—

1. As an article of manufacture, a fitting comprising a bushing including an annular flange and an uninterrupted nipple receiving portion, a nipple comprising a one piece member having a valve seat and integral disposed lugs, a valve and means yieldably holding said valve against said seat and operatively supported by said nipple receiving portion of said bushing, the nipple being detachable from said receiving portion due to excess pressure within the fitting, the nipple and uninterrupted nipple receiving portion of the bushing being solely connected by frictional engagement.

2. As an article of manufacture, including in combination, a bushing having an annular flange, a nipple receiving portion merging with said flange, a nipple comprising a one piece member with integral lugs and having a portion thereof solely frictionally secured to said nipple receiving portion and abutting said flange, a valve and means yieldably holding said valve and supported by said nipple receiving portion, the nipple being detachable from said receiving portion due to excess pressure within the latter.

3. As an article of manufacture, including in combination, a bushing having an annular flange and an uninterrupted nipple receiving portion integrally associated therewith, a nipple comprising a one piece member including valve means supported by said nipple receiving portion; said nipple being connected solely by frictional engagement to said nipple receiving portion and comprising opposed alined integral lugs.

4. As an article of manufacture, a fitting comprising a bushing including an annular flange and an uninterrupted nipple receiving portion, a nipple comprising a one piece member having diametrically disposed lugs, valve supporting means within said member and maintained on said nipple receiving portion and a valve yieldably held by said supporting means and operatively associated with said nipple, the latter and said nipple receiving portion being connected solely by frictional engagement.

In witness whereof, I hereunto subscribe my name this 10th day of May 1930.

JOSEPH HASS.